(12) United States Patent
Sun et al.

(10) Patent No.: US 8,679,705 B2
(45) Date of Patent: Mar. 25, 2014

(54) ELECTRODE FOR FUEL CELL AND FUEL CELL EMPLOYING THE ELECTRODE

(75) Inventors: Hee-young Sun, Yongin-si (KR); Seong-woo Choi, Yongin-si (KR); Tae-young Kim, Yongin-si (KP)

(73) Assignee: Samsung SDI Co., Ltd., Yongin-si (KR)

( * ) Notice: Subject to any disclaimer, the term of this patent is extended or adjusted under 35 U.S.C. 154(b) by 1002 days.

(21) Appl. No.: 11/765,033

(22) Filed: Jun. 19, 2007

(65) Prior Publication Data

US 2008/0020264 A1  Jan. 24, 2008

(30) Foreign Application Priority Data

Jul. 21, 2006 (KR) ................... 2006-68411

(51) Int. Cl.
- H01M 4/62 (2006.01)
- H01M 4/86 (2006.01)
- H01M 4/88 (2006.01)
- H01M 4/92 (2006.01)
- H01M 8/00 (2006.01)

(52) U.S. Cl.
USPC ........... 429/530; 429/523; 429/524; 429/525; 429/526; 429/527; 429/535; 427/115

(58) Field of Classification Search
USPC ........... 429/41, 523, 524, 525, 526, 527, 530, 429/535; 528/403; 427/115
See application file for complete search history.

(56) References Cited

U.S. PATENT DOCUMENTS

| | | | |
|---|---|---|---|
| 4,976,904 A * | 12/1990 | Bilhorn ........................ | 264/104 |
| 5,525,436 A | 6/1996 | Savinell et al. | |
| 6,042,968 A * | 3/2000 | Onorato et al. ............... | 429/188 |
| 2002/0127474 A1* | 9/2002 | Fleischer et al. .............. | 429/309 |
| 2004/0231143 A1* | 11/2004 | Visco et al. ................... | 29/623.5 |
| 2005/0074651 A1* | 4/2005 | Kidai et al. .................... | 429/30 |

(Continued)

FOREIGN PATENT DOCUMENTS

| CN | 1310190 A | 8/2001 |
|---|---|---|
| CN | 1803887 A | 7/2006 |

(Continued)

OTHER PUBLICATIONS

Human translation of JP 2003286320 A, Takeichi et al., Oct. 2003.*

(Continued)

*Primary Examiner* — Sean P Cullen
(74) *Attorney, Agent, or Firm* — Christie, Parker & Hale, LLP

(57) ABSTRACT

An electrode for fuel cells including a catalyst layer containing a benzoxazine monomer, a catalyst and a binder, and a fuel cell employing the electrode. The electrode for the fuel cells contains an even distribution of benzoxazine monomer, which is a hydrophilic (or phosphoric acidophilic) material and dissolves in phosphoric acid but does not poison catalysts, thereby improving the wetting capability of phosphoric acid ($H_3PO_4$) within the electrodes and thus allowing phosphoric acid to permeate first into micropores in electrodes. As a result, flooding is efficiently prevented. That is, liquid phosphoric acid existing in large amount within the electrodes inhibits gas diffusion which; this flooding occurs when phosphoric acid permeates into macropores in the electrodes. This prevention of flooding increases the three-phase interfacial area of gas (fuel gas or oxidized gas)-liquid (phosphoric acid)-solid (catalyst). Therefore, the fuel cell employing the electrode can operate under conditions of high-temperature and a dry environment and demonstrate improved cell performance.

27 Claims, 5 Drawing Sheets

(56) References Cited

U.S. PATENT DOCUMENTS

| | | | |
|---|---|---|---|
| 2005/0084728 A1* | 4/2005 | Kim et al. | 429/33 |
| 2005/0089744 A1 | 4/2005 | Kim et al. | |
| 2005/0130006 A1* | 6/2005 | Hoshi et al. | 429/30 |
| 2005/0142413 A1 | 6/2005 | Kimura et al. | |
| 2006/0078774 A1* | 4/2006 | Uensal et al. | 429/33 |
| 2007/0020507 A1 | 1/2007 | Kim et al. | |
| 2007/0141426 A1 | 6/2007 | Choi et al. | |

FOREIGN PATENT DOCUMENTS

| | | | |
|---|---|---|---|
| EP | 1247884 | | 10/2002 |
| EP | 1253661 | | 10/2002 |
| EP | 1536500 A1 * | | 6/2005 |
| EP | 1760110 | | 3/2007 |
| JP | 5-283082 | | 10/1993 |
| JP | 11-503262 | | 3/1999 |
| JP | 2003-297386 | | 10/2003 |
| JP | 2003286320 A * | | 10/2003 |
| JP | 2004-131532 | | 4/2004 |
| JP | 2004103494 A * | | 4/2004 |
| JP | 2004149779 A * | | 5/2004 |
| JP | 2005-129534 | | 5/2005 |
| JP | 2007-070631 | | 3/2007 |
| KR | 2006-55291 | | 5/2006 |
| WO | WO 2005/00955 | | 1/2005 |

OTHER PUBLICATIONS

Human translation of JP 2004103494 A, Kimura et al., Apr. 2004.*
Machine translation of JP 2004149779, Sakaguchi et al., May 2004.*
Schuster, Martin F.H., et al., "Anhydrous Proton-Conducting Polymers", Annu. Rev. Mater. Res., vol. 33, Apr. 9, 2003, pp. 233-261.
Yamada, M. et al., "Anhydrous proton conducting polymer electrolytes based on poly(vinylphosphonic acid)-heterocyclic composite material", Polymer, vol. 46, No. 9, Apr. 15, 2005, pp. 2986-2992.
Pu, H., et al., "Proton Transport in Polybenzimidazole Blended with $H_3PO_4$ or $H_2SO_4$", J. Polymer Science, Part B: Polymer Physics, vol. 40, 2002, pp. 663-669.
Office Action issued in corresponding European Patent Application No. 07250814.6 dated Oct. 30, 2007,.
11/765,056 Jun. 19, 2007 Kyung-jung Kwon et al. Samsung SDI Co., Ltd.
11/514,254, Sep. 1, 2006, Seongwoo Choi et al., Samsung Electronics Co., Ltd.
11/514,831, Sep. 5, 2006, Myung-jin Lee et al., Samsung Electronics Co., Ltd.
11/743,778, May 2, 2007, Seongwoo Choi et al., Samsung Electronics Co., Ltd.
11/856,350, Sep. 17, 2007, Seongwoo Choi et al., Samsung Electronics Co., Ltd.
12/247,338, Oct. 8, 2008, Seongwoo-Choi et al., Samsung Electronics Co., Ltd.
12/208,664, Sep. 11, 2008, Seongwoo Choi et al., Samsung Electronics Co., Ltd.
12/262,854, Oct. 31, 2008, Seongwoo-Choi et al., Samsung Electronics Co., Ltd.
11/947,011, Nov. 29, 2007, Seongwoo Choi et al., Samsung Electronics Co., Ltd.
12/266,039, Nov. 6, 2008, Seongwoo Choi et al., Samsung Electronics Co., Ltd.
12/208,492, Sep. 11, 2008, Seongwoo Choi et al., Samsung Electronics Co., Ltd.
Chinese Certificate of Patent, dated May 26, 2010, for corresponding Chinese Patent application 200710087706.6, noting listed references in this IDS, as well as U.S. Patent 5,525,436 previously filed in an EDS dated Jan. 10, 2008.
Japanese Office action dated Nov. 13, 2012, for corresponding Japanese Patent application 2007-185592, (2 pages).
Patent Abstracts of Japan, and English machine translation of Japanese Publication 2004-131532 listed above, (59 pages).

* cited by examiner

ELECTRODE FOR FUEL CELL AND FUEL CELL EMPLOYING THE ELECTRODE

CROSS-REFERENCE TO RELATED APPLICATIONS

This application claims the benefit of Korean Patent Application No. 2006-68411, filed on Jul. 21, 2006, in the Korean Intellectual Property Office, the disclosure of which is incorporated herein in its entirety by reference.

BACKGROUND OF THE INVENTION

1. Field of the Invention

Aspects of the present invention relate to an electrode for a fuel cell and a fuel cell employing the same; more particularly, to an electrode for a fuel cell in which materials having an affinity for phosphoric acid are evenly dispersed within the electrode to ensure that phosphoric acids preferentially penetrate into micropores and thus prevent cell performance deterioration caused by the presence of excess phosphoric acid in the electrode; and a fuel cell whose efficiency is improved by employing the electrode.

2. Description of the Related Art

Fuel cells using a polymer electrolyte membrane as an electrolyte are expected to be used as a power supply for electric cars or a distributed power generation system for domestic use since the operating temperature thereof is relatively low and miniaturization is possible. Polymer electrolyte membranes used in polymer electrolyte membrane fuel cells include perfluorocarbonsulfonate polymer membranes, for example, NAFION® (DuPont Company).

However, this type of polymer electrolyte membrane needs moisture to show proton conduction, so humidification of the membrane is needed. Further, hot operation at a temperature of 100° C. or higher is required to increase the cell system efficiency sufficiently; however such a high temperature evaporates and dries up moisture in an electrolyte membrane, thereby resulting in dysfunction as a solid electrolyte.

To solve such problems originating from the conventional techniques, an unhumidified electrolyte membrane which can operate at high temperatures in excess of 100° C. has been developed. For example, Japanese Patent Laid-open No. hei11-503262 discloses materials for composing unhumidified electrolyte membranes, including polybenzimidazole doped with phosphoric acid.

Also, in low-temperature operating cells using perfluorocarbon sulfonic polymer membranes, an anhydrous electrode made by mixing polytetrafluoroethylene (PTFE), which is a water repellant, is largely used to prevent poor gas diffusion caused by ambient water or water produced during power generation at the electrodes, in particular a cathode. (An example is Japanese Patent Laid-open No. hei05-283082).

Also, in phosphoric acid-type fuel cells which are operated at temperatures of 150 to 200° C., liquid phosphoric acid is used as an electrolyte, but this liquid phosphoric acid exists within electrodes in large amounts and also inhibits gas diffusion. Thus, polytetrafluoroethylene (PTFE) is mixed within an electrode catalyst, and an electrode catalyst layer is used to prevent micropores in the electrodes from being blocked with phosphoric acid.

Also, regarding fuel cells using polybenzimidazole (PBI) containing phosphoric acid in electrolyte membranes, which combination comprises a high-temperature unhumidified electrolyte, impregnation of liquid phosphoric acid into electrodes has been attempted to improve the interfacial contact between electrodes and membranes, and there have been efforts to increase the loading concentration of metal catalysts, but satisfactory properties could not be obtained.

SUMMARY OF THE INVENTION

Aspects of the present invention provide an electrode for fuel cells which can improve properties of the fuel cells by increasing the three-phase interfacial area of gas (fuel gas or oxidized gas)-liquid (phosphoric acid)-solid (catalyst) on the surface of the catalyst, as well as methods of manufacturing a fuel cell employing the electrode.

Additional aspects and/or advantages of the invention will be set forth in part in the description which follows and, in part, will be obvious from the description, or may be learned by practice of the invention.

One aspect of the present invention provides an electrode for fuel cells including a catalyst layer containing a benzoxazine monomer represented by Formula 1 below, a catalyst, and a binder:

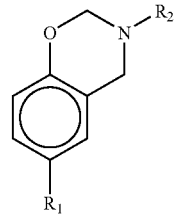

[Formula 1]

where $R_1$ is a hydrogen atom, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C3-C20 heteroaryl group, a substituted or unsubstituted C4-C20 cycloalkyl group, a substituted or unsubstituted C2-C20 heterocyclic group, a halogen atom, a hydroxy group, or a cyano group; and $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C3-C20 heteroaryl group, a substituted or unsubstituted C3-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group.

Another aspect of the current invention provides a method of manufacturing an electrode for fuel cells, including: obtaining a dispersed solution by dispersing a catalyst in a solvent; adding, mixing and stirring a mixture containing a benzoxazine monomer represented by Formula 1, a binder, and a solvent with the dispersed solution; and coating the mixture on the surface of a carbon support:

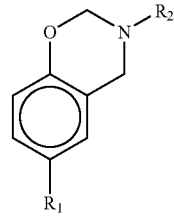

[Formula 1]

where $R_1$ is a hydrogen atom, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C3-C20 heteroaryl group, a substituted or unsubstituted C4-C20 cycloalkyl group, a substituted or unsubstituted C2-C20 heterocyclic group, a halogen atom, a hydroxy group, or a cyano group; and $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C3-C20 heteroaryl group, a substituted or unsubstituted C3-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group.

Another aspect of the present invention provides a fuel cell employing the electrode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
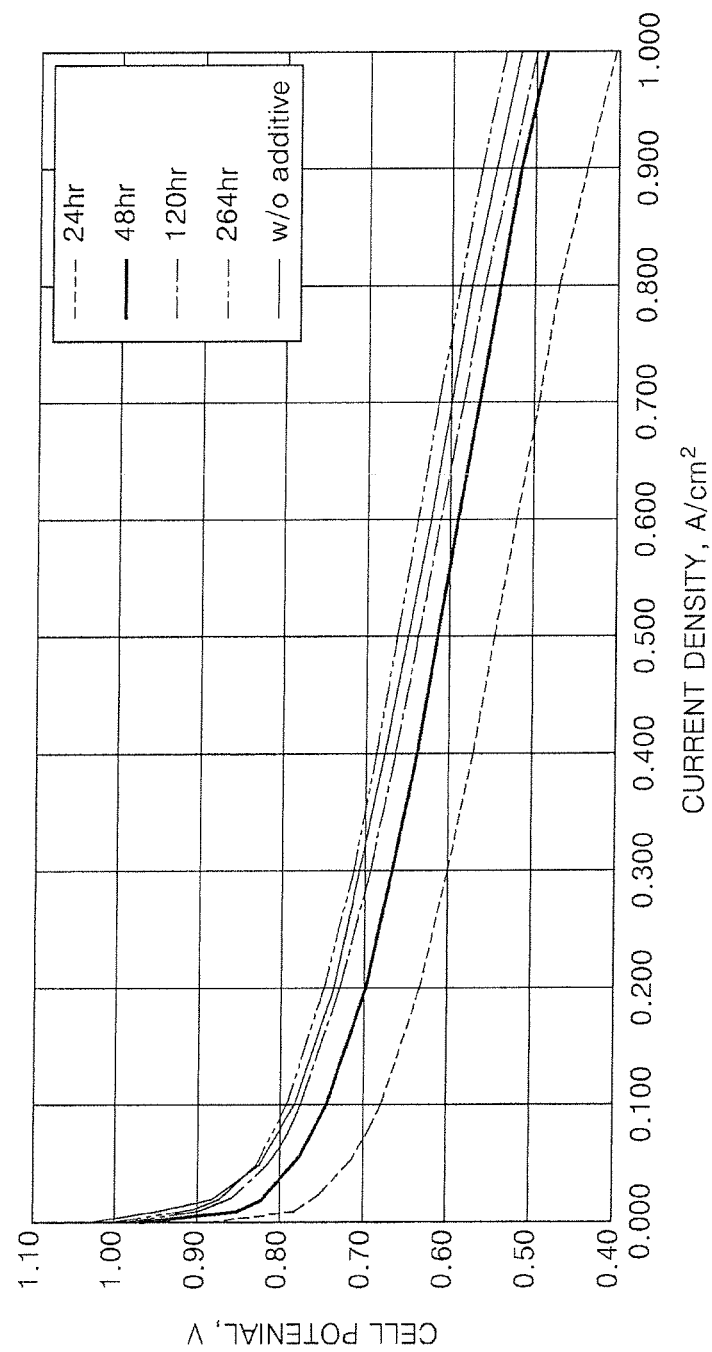
FIGS. 1 through 4 show cell potential changes as a function of current density for fuel cells manufactured according to Examples 1 to 3, and Comparative Example 1, respectively.
Figure 2:
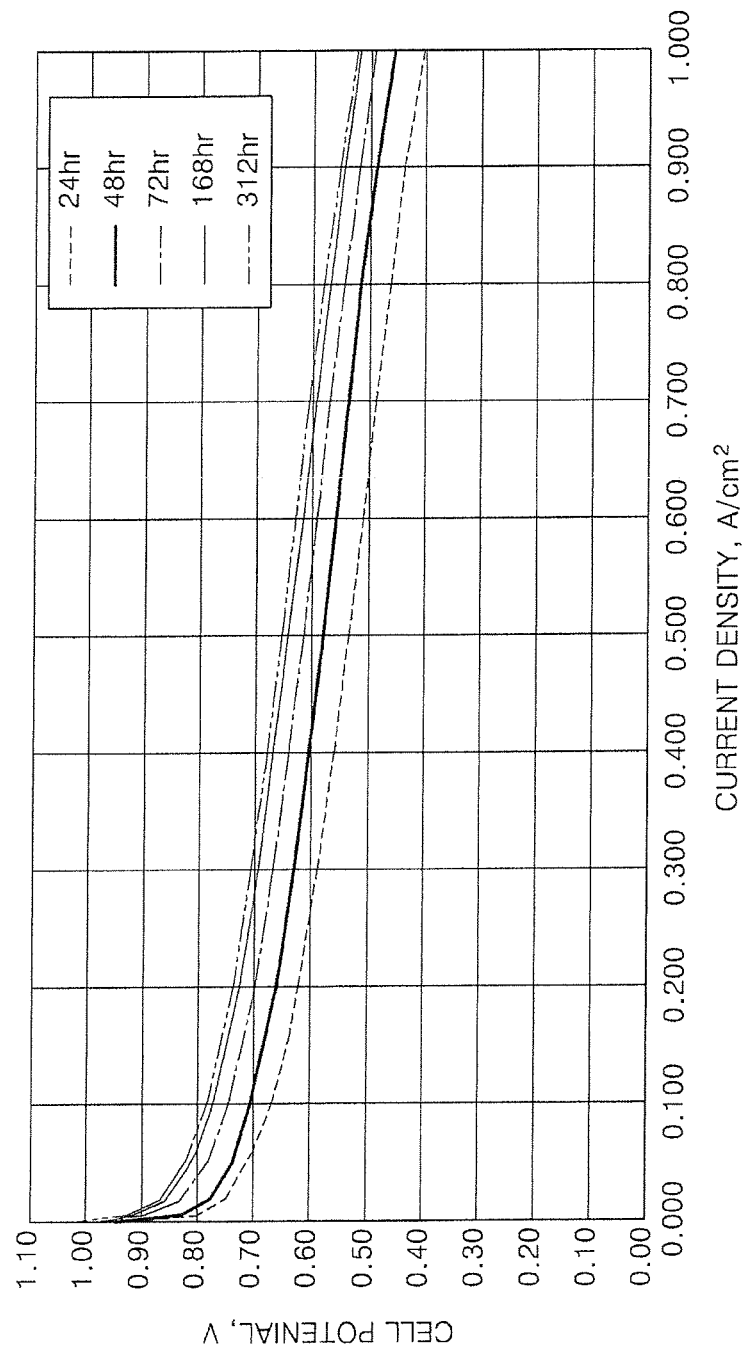
Figure 3:
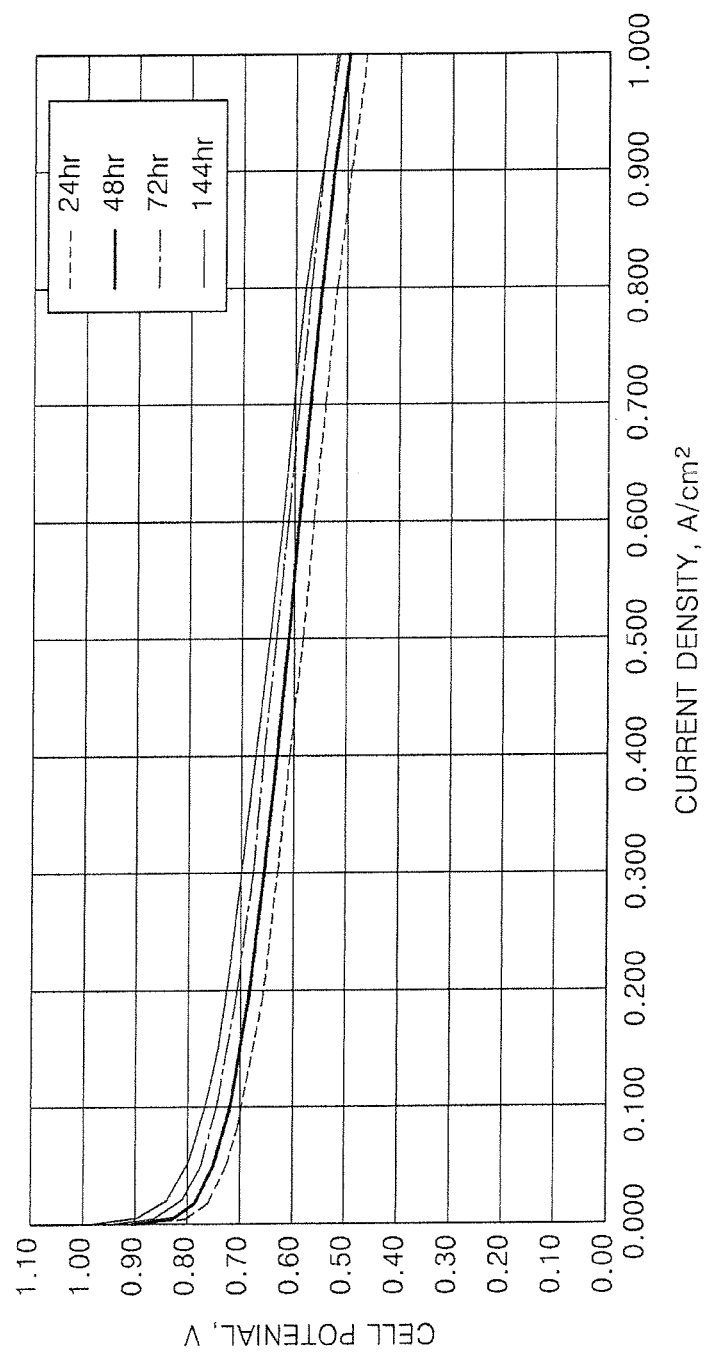
Figure 4:
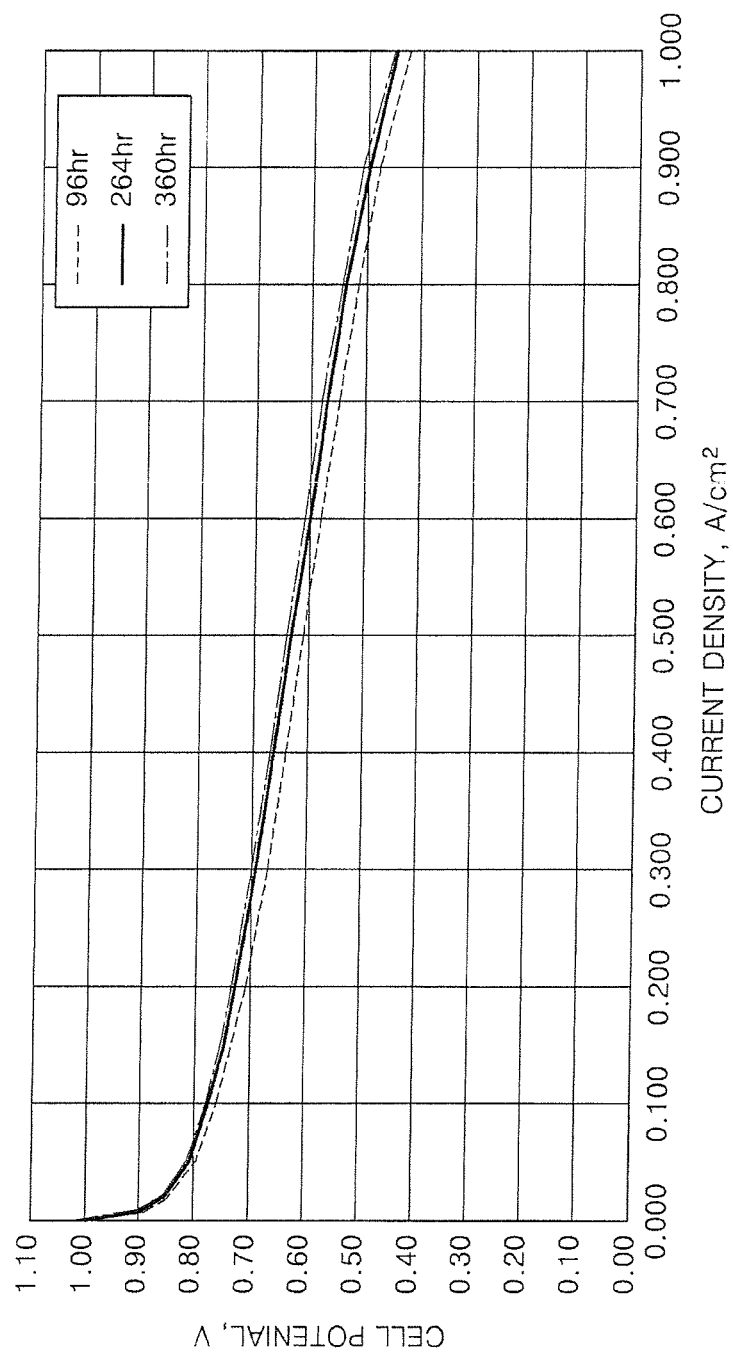

Reference will now be made in detail to the present embodiments of the present invention. The embodiments are described below in order to explain the present invention, including reference to the figures.

The electrode for fuel cells according to an embodiment of the present invention contains an even distribution of a hydrophilic or phosphoric acidophilic benzoxazine monomer represented by Formula 1 below, which is soluble in phosphoric acid but does not poison a catalyst, thereby improving the wetting capability of phosphoric acid ($H_3PO_4$) within the electrode and allowing the phosphoric acid to permeate preferentially into micropores of the electrode. This efficiently prevents the problem of flooding that occurs when phosphoric acids permeate principally into macropores of the electrode, such that liquid phosphoric acids exist in large amounts within the electrode and inhibit gas diffusion. Thus, the three-phase interfacial area of gas phase (fuel gas or oxidized gas)-liquid phase (phosphoric acid)-solid phase (catalyst) is increased.

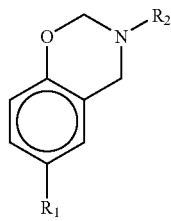

[Formula 1]

In this embodiment, $R_1$ is a hydrogen atom, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C3-C20 heteroaryl group, a substituted or unsubstituted C4-C20 cycloalkyl group or a substituted or unsubstituted C2-C20 a heterocyclic group, a halogen atom, a hydroxy group, or a cyano group, and $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C3-C20 heteroaryl group, a substituted or unsubstituted C3-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group.

In Formula 1, $R_1$ may specifically be a C1-C10 alkyl group, an allyl group, a C6-C20 aryl group, a tertbutyl group, a C2-C10 alkenyl group, or a C2-C10 alkynyl group, and $R_2$ may specifically be aniline, a 1-(3-aminopropyl)imidazolyl group, a 2-aminobenzimidazolyl group, an allyl amine-derivative group, or a group represented by the Formulae below:

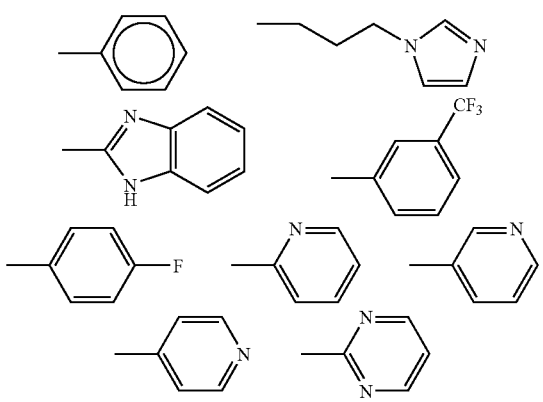

More specifically, examples of a benzoxazine monomer represented by Formula 1 include the compounds represented by Formulae 2 through 11:

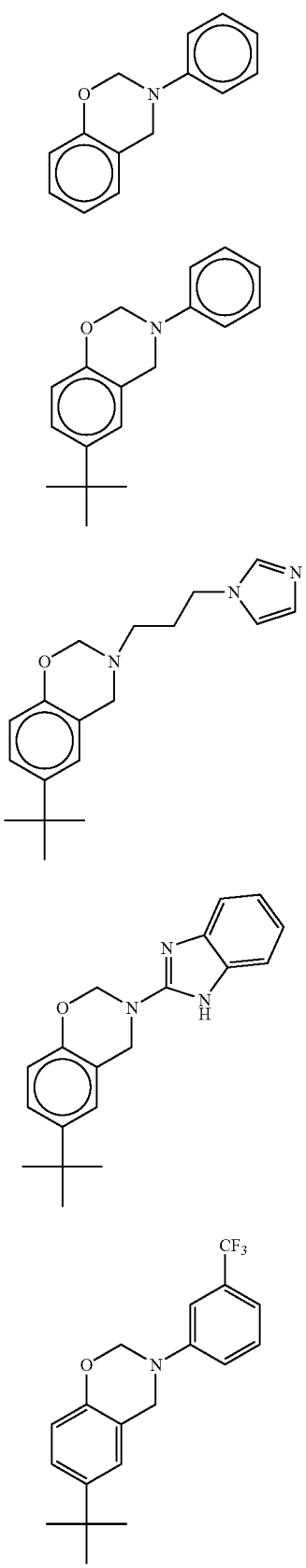
The electrode according to an embodiment of the present invention contains a catalyst and a binder in addition to the benzoxazine monomer of Formula 1. The benzoxazine monomer of Formula 1 is a material for improving phosphoric acid wettability, and the concentration thereof may be 0.001 to 0.5 parts by weight based on one part by weight of the catalyst. A concentration of the benzoxazine monomer of Formula 1 lower than 0.001 parts by weight is insufficient for improving the wetting state of the electrode, while a concentration higher than 0.5 parts by weight undesirably accelerates flooding.

For the catalyst, platinum (Pt) is independently used, or an alloy or mixture of Pt with at least one metal selected from the group consisting of gold, palladium, rhodium, iridium, ruthenium, tin, molybdenum, cobalt, and chromium is used.

For the binder, at least one polymer selected from the group consisting of poly(vinylidenefluoride), polytetrafluoroethylene, and tetrafluoroethylene-hexafluoroethylene copolymer is used, and the content of the binder may be 0.001 to 0.5 parts by weight based on one part by weight of the catalyst. When the concentration of the binder is lower than 0.001 parts by weight, it is insufficient to connect the catalyst particles, and thus the catalyst particles function separately rather than together. As a result, the catalyst layer detaches from the carbon paper. When the concentration of the binder is higher than 0.5 parts by weight, the resistance of the electrode is increased, and thus the cell performance deteriorates.

A method of manufacturing the electrode for fuel cells is described below.

First, a dispersed solution is obtained by dispersing a catalyst in a solvent. N-methyl-pyrrolidone (NMP), dimethylacetamide (DMAc) or the like are used as the solvent, and the concentration of the solvent is 1 to 10 parts by weight based on one part by weight of the catalyst.

A mixture containing a benzoxazine monomer represented by Formula 1, a binder, and the solvent are added to the dispersed solution and mixed, and the resulting mixture is stirred. The concentration of the benzoxazine monomer is 0.001 to 0.5 parts by weight based on one part by weight of the catalyst. The concentration of the binder is 0.001 to 0.1 parts by weight based on one part by weight of the catalyst.

The electrode is completed by coating the above resulting mixture on the surface of a carbon support material. The carbon support material is fixed on a glass substrate for convenience of coating. Coating methods are not limited to particular methods, but methods such as coating using a doctor blade, Meyer Bar coating, screen printing or the like can be used.

After coating the mixture, drying is performed to remove the solvent, and is carried out at temperatures in the range of 20 to 150° C. The drying time depends on the drying temperature, and is carried out for 10 to 60 minutes. The drying may be carried out for 1 hour at room temperature; for at least 15 minutes at 60° C.; for at least 10 minutes at 80° C.; or for at least 10 minutes at 120° C.

Methods of manufacturing a fuel cell using the electrode for fuel cells according to an embodiment of the present invention are described below.

For electrolyte membranes in an embodiment of the present invention, any electrolyte membranes commonly used in fuel cells can be used. Examples include a polybenzimidazole electrolyte membrane, a polybenzoxazine-polybenzimidazole copolymer electrolyte membrane, a polytetrafluoroethylene microporous membrane, etc.

According to an embodiment of the present invention, an electrolyte membrane containing a cross-linked co-polymer of polybenzoxazine compounds which is prepared by co-polymerization of one compound selected from a first benzoxazine monomer represented by Formula 1 below, a second benzoxazine monomer represented by Formula 12 below and a cross-linkable compound where:

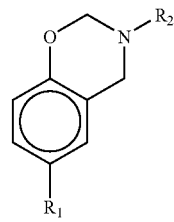

[Formula 1]

$R_1$ is a hydrogen atom, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C3-C20 heteroaryl group, a substituted or unsubstituted C4-C20 cycloalkyl group, a substituted or unsubstituted C2-C20 heterocyclic group, a halogen atom, a hydroxy group, or a cyano group;

$R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C3-C20 heteroaryl group, a substituted or unsubstituted C3-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and

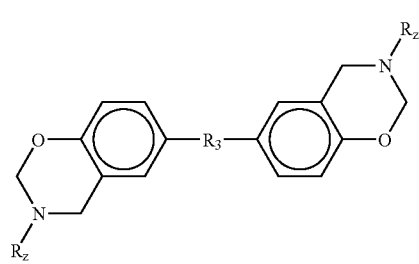

[Formula 12]

where $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C3-C20 heteroaryl group, a substituted or unsubstituted C3-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and $R_3$ is selected from the group consisting of a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C3-C20 heteroarylene group, and —C(=O)—, —SO$_2$—.

Examples of the benzoxazine monomer represented by Formula 1 are compounds represented by Formulae 2 through 11, and examples of the second benzoxazine monomer represented by Formula 12 are compounds represented by Formulae 13 through 17.

[Formula 13]
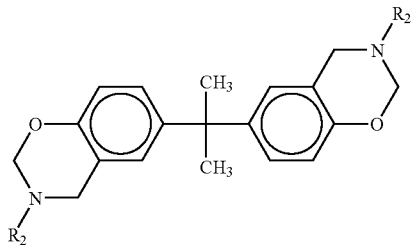

[Formula 14]
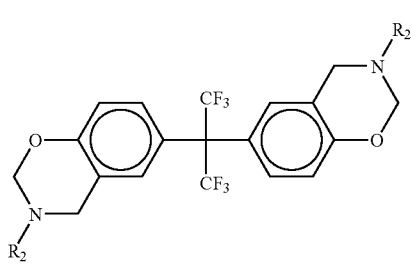

[Formula 15]
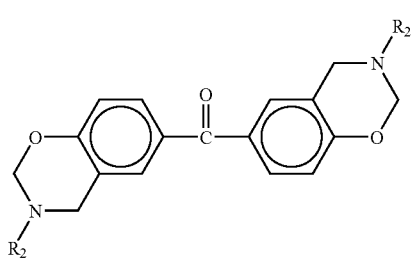

[Formula 16]
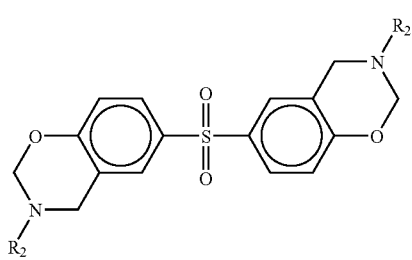

[Formula 17]
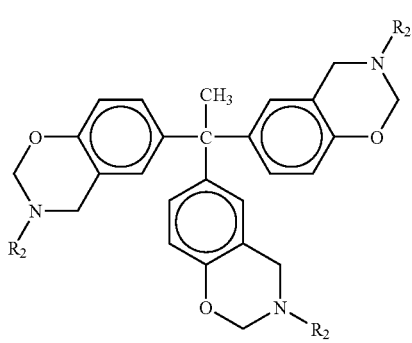

and $R_2$, specifically, is, $-CH_2-CH=CH_2$, or one of the groups represented by the following Formulae:

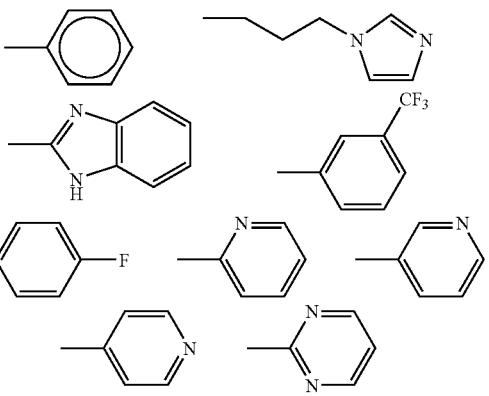

Examples of the cross-linkable compounds include at least one polymer selected from polybenzimidazole (PBI), polybenzothiazole, polybenzoxazole, and polyimide, but are not limited thereto.

The cross-linkable compound is mixed with one compound selected from the first benzoxazine monomer represented by Formula 1 and the second benzoxazine monomer represented by Formula 12 in a predetermined mixing ratio. The concentration of the cross-linkable compound may be 5 to 95 parts by weight based on 100 parts by weight of the combination of the first benzoxazine monomer represented by Formula 1 and the second benzoxazine monomer represented by Formula 12.

When the concentration of the cross-linkable compound is lower than 5 parts by weight, proton conductivity drops due to a lack of phosphoric acid impregnation. On the other hand, when the concentration of the cross-linkable compound is higher than 95 parts by weight, the cross-linking body dissolves in 85% phosphoric acid, which causes undesirable gas permeation.

Methods of forming electrolyte membranes are now described with examples using polybenzimidazole as the cross-linkable compound.

According to the first method, a monomer selected from a first benzoxazine monomer represented by Formula 1 and a second benzoxazine monomer represented by Formula 12 were blended with a cross-linkable compound such as PBI, and a curing reaction was carried out at temperatures in the range of 50 to 250° C., preferably 80 to 220° C. Then, a proton conductor such as an acid was loaded into the resulting co-polymer to form an electrolyte membrane.

According to the second method, an electroyte membrane is formed using a mixture of a first benzoxazine monomer represented by Formula 1 and a second benzoxazine monomer represented by Formula 12 with a cross-linkable compound such as PBI.

As a method of forming the electrolyte membrane, a tape casting method or conventional coating methods can be used. Examples of the coating methods include casting the mixture on a support material using a doctor blade. Here the doctor blade has a gap of 250 500 μm.

When the doctor blade casting method is used for forming the membrane, it is necessary to separate and remove the support material from the electrolyte membrane between the curing reaction and injecting the acid. To remove the support material, soaking is carried out in distilled water at temperatures of 60 to 80° C.

For the support material, any material which can support the electrolyte membrane can be used. Examples of the support material include a glass substrate, a polyimide film, and the like. When the tape casting method is used, the tape-cast membrane is separated from the support material such as polyethylene terephthalate and put into an oven for curing; thus the subsequent process of removing the support material is not required.

Also, when using a tape casting method using a mixture comprising benzoxazine monomers and polybenzimidazole to form the membrane, filtering the mixture is added.

After heating and curing the formed membrane, the membrane is loaded with a proton conductor such as an acid to form the electrolyte membrane.

Examples of the proton conductor include phosphoric acid, C1-C10 alkyl phosphonic acid, and the like. Examples of the C1-C10 alkyl phosphonic acid include ethyl phosphonic acid or the like.

The concentration of the proton conductor is 300 to 1000 parts by weight based on 100 parts by weight of the electrolyte membrane. The concentration of acids used in an embodiment of the present invention is not limited to a particular concentration, but when using phosphoric acid, an 85 weight % of phosphoric acid solution is used. The soaking time for the phosphoric acid is 2.5 to 14 hours at 80° C.

The electrolyte membrane can be used as a hydrogen ion conducting membrane for fuel cells. A process of manufacturing an electrode-membrane assembly for fuel cells is as below.

The term "membrane and electrode assembly (MEA)" as used in these aspects of the present invention refers to a stacked structure in which electrodes including a catalyst layer and a diffusion layer are disposed on both sides of an electrolyte membrane.

The MEA in an embodiment of the present invention is formed by positioning the electrodes including the electrode catalyst layer on both sides of the electrolyte membrane that had been obtained from the above process, and bonding them at high temperature and pressure, and then by bonding a fuel diffusion layer thereto.

The temperature is raised up to the temperature for the electrolyte membrane softening, and a pressure of 0.1 to 3 ton/cm², particularly 1 ton/cm² of pressure is applied.

Then, a bipolar plate is installed on the fuel diffusion layer of the electrode-membrane assembly to complete the fuel cell. The bipolar plate has a slot for fuel supply, and functions as a current collector. In this embodiment of the present invention, the polymer electrolyte membrane is preferably used in a fuel cell, but the polymer electrolyte membrane is not limited to this usage.

The definitions of the substituents used in the embodiments of the present invention comprising the above Formulae are listed below.

Specific examples of the unsubstituted C1-C20 alkyl group in the Formulae of the above embodiments of the present invention include methyl, ethyl, propyl, isobutyl, sec-butyl, pentyl, iso-amyl, hexyl, and the like. At least one hydrogen atom of the alkyl group can then be substituted with: a) a halogen atom; b) an additional substituted C1-C20 alkyl group that is itself substituted with a halogen atom (for example, $CCF_3$, $CHCF_2$, $CH_2F$, $CCl_3$, and the like), a hydroxy group, a nitro group, a cyano group, an amino group, an amidino group, a hydrazine, a hydrazone, a carboxyl group or a salt thereof, a sulfonic group or a salt thereof, or a phosphate group or salt thereof; c) or an additional C1-C20 alkyl group, C2-C20 alkenyl group, C2-C20 alkynyl group, C2-C20 heteroalkyl group, C6-C20 aryl group, C7-C20 arylalkyl group, C6-C20 heteroaryl group, or C6-C20 heteroarylalkyl group.

Specific examples of the unsubstituted C2-C20 alkenyl group in the Formulae of the above embodiments of the present invention include vinylene, allylene, and the like, and at least one hydrogen atom of the alkenyl group also can be substituted with the same substituents as in the alkyl group, as listed above.

Specific examples of the unsubstituted C2-C20 alkynyl group in the Formulae of the above embodiments of the present invention include acetylene and the like, and at least one hydrogen atom of the alkynyl group can be substituted with the same substitutents as in the alkyl group, as listed above.

Specific examples of the unsubstituted C2-C20 alkylene group in the Formulae of the above embodiments of the present invention include methylene, ethylene, propylene, isobutylene, sec-butylene, pentylene, iso-amylene, hexylene, and the like, and at least one hydrogen atom of the alkylene group can be substituted with the same substitutents as in the alkyl group, as listed above.

Specific examples of the unsubstituted C2-C20 alkenylene group in the Formulae of the above embodiments of the present invention include an aryl group and the like, and at least one hydrogen atom of the alkenylene group can be substituted with the same substitutents as in the alkyl group, as listed above.

Specific examples of the unsubstituted C2-C20 alkynylene group in the Formulae of the above embodiments of the present invention include an acetylene group and the like, and at least one hydrogen atom of the alkynylene group can be substituted with the same substitutents as in the alkyl group as listed above.

The aryl group used in the above embodiments of the present invention can be more than one ring or a C6-C20 carbocycle aromatic system having at least one additional ring where the rings are attached together in a chain or are fused. The term "aryl" includes an aromatic radical such as a phenyl, naphthyl, or tetrahydronaphthyl radical. The aryl group can have substituents such as haloalkylene, nitro, cyano, alkoxy and low carbon number alkylamino substituents. Also, at least one hydrogen atom of the aryl group can be substituted with the same substituents as in the alkyl group as listed above.

The arylene group used in the above embodiments of the present invention can be more than one ring or a C6-C20 carbocycle aromatic system having at least one additional ring where the rings are attached together in a chain or are fused. The term arylene includes an aromatic radical such as a phenylene, naphthylene, or tetrahydronaphthylene radical. The arylene group can have substituents such as haloalkylene, nitro, cyano, alkoxy and low carbon number alkylamino substituents. Also, at least one hydrogen atom of the arylene group can be substituted with the same substituents as in the alkyl group as listed above.

The arylalkyl group used in the above embodiments of the present invention includes an aryl group in which some hydrogen atoms are substituted with a low carbon number alkyl group such as a radical including a methyl, ethyl, propyl, or similar radical. Examples include benzyl, phenylethyl, or the like. At least one hydrogen atom of the arylalkyl group can be substituted with the same substituents as in the alkyl group as listed above.

The heteroaryl group used in the above embodiments of the present invention includes a C3-C20 monocyclic or bicyclic aromatic ring that includes one to three non-carbon atoms in the rings selected from N, O, P and S. At least one hydrogen atom of the heteroaryl group can be substituted with the same substituents as in the alkyl group as listed above.

The heteroarylene group used in the above embodiments of the present invention includes a C3-C20 monocyclic or bicyclic aromatic ring that includes one to three non-carbon atoms in the ring selected from N, O, P and S. At least one hydrogen atom of the heteroarylene group can be substituted with the same substituents as in the alkyl group as listed above.

The heteroarylalkyl group used in the above embodiments of the present invention includes a heteroaryl group in which some hydrogen atoms are substituted with an alkyl group. At least one hydrogen atom of the heteroarylalkyl group can be substituted with the same substituents as in the alkyl group as listed above.

The carbocyclic group used in the above embodiments of the present invention includes a C5-C10 ring group such as a cyclohexyl group, and at least one hydrogen atom of the carbocyclic group can be substituted with the same substituents as in the alkyl group as listed above.

The carbocyclic alkyl group used in the above embodiments of the present invention includes a carbocyclic group in which at least one hydrogen of the alkyl group ring is substituted with an additional alkyl group. At least one hydrogen atom of the additional alkyl group can also be substituted with the same substituents as in the alkyl group listed above.

The heterocyclic group used in the above embodiments of the present invention includes a ring group having 5 to 10 atoms including non-carbon atoms in the ring such as nitrogen, sulfur, phosphorus, oxygen, or the like, and at least one hydrogen atom of the heterocyclic group ring can also be substituted with the same substituents as in the alkyl group as listed above.

The heterocyclic alkyl group used in the above embodiments of the present invention includes a heterocarbocyclic group in which at least one hydrogen of the heterocyclic alkyl group is substituted with an additional alkyl group. At least one hydrogen atom of the heterocyclic alkyl group can be substituted with the same substituents as in the alkyl group as listed above.

Hereinafter, the present invention will be described with reference to the following examples. The following examples are for illustrative purposes only and are not intended to limit the scope of the invention.

EXAMPLES

Example 1

Manufacturing an Electrode for Fuel Cells and a Fuel Cell Employing the Electrode 2 g of PtCo/C catalyst and 9 g of n-methyl-2-pyrrolidone (NMP) were added to a stirring container and stirred for 2 minutes using a high-speed stirring machine. To this mixture, a solution in which 0.4 g of t-BUPH-a, represented by Formula 4 had been dissolved in 3.6 g of NMP was added and this second mixture was stirred for an additional 2 minutes.

Next, a solution in which 0.1 g of polyvinylidenefluoride had been dissolved in 3.9 g of NMP was added to the second mixture and was stirred for an additional 2 minutes to make a slurry for forming electrode catalyst layers.

Carbon paper was cut to the size of 4×7 cm$^2$, fixed on a glass substrate, and coated with the slurry for forming a cathode catalyst layer using a doctor blade (Sheen instrument) with a gap controlled to 850 μm.

The glass-carbon paper-slurry preparation was then dried for one hour at room temperature to provide a cathode. The loading of platinum cobalt catalyst in the completed cathode is 3.0 mg/cm$^2$.

An anode used in embodiments of the present invention was obtained by the process described below.

2 g Pt/C and 9 g of NMP were added to a stirring container and stirred for 2 minutes using a high-speed stirring machine. Next, a solution in which 0.1 g of polyvinylidenefluoride had been dissolved in 3.9 g of NMP was added to the above mixture and stirred for an additional 2 minutes to make a slurry for forming anode catalyst layers. The slurry for forming anode catalyst layers was coated on carbon paper having a microporous layer using a bar coater machine. The loading of Pt of the completed anode is 1.4 mg/cm$^2$.

Separately, 65 parts by weight of benzoxazine monomer represented by Formula 3 and 35 parts by weight of a polybenzimidazole were blended and set at temperatures in the range of 50 to 250° C., preferably of 80 to 220° C. Then, 85 weight % phosphoric acid was loaded therein to form an electrolyte membrane. The concentration of phosphoric acid was approximately 500 parts by weight based on 100 parts % by total weight of the electrolyte membrane.

A membrane electrode assembly (MEA) was manufactured by disposing the electrolyte membrane between the cathode and the anode, wherein the cathode and the anode were used without being impregnated with phosphoric acid.

A 200 μm-thick polytetrafluoroethylene (e.g., TEFLON® by DuPont) sheet for a main gasket and a 20 μm-thick polytetrafluoroethylene sheet for a sub-gasket were placed between each electrode and the electrolyte membrane to block gas permeation between the cathode and the anode. The MEA was completed by controlling and increasing the pressure applied on the MEA from 1, through 2, and to 3 newton-meters (N-m) torque using a torque wrench.

The performance of a fuel cell using the MEA was measured for generating electricity by circulating hydrogen to the anode with a flow rate of 100 ccm (cubic cm per minute), and air to the cathode with a flow rate of 250 ccm (cubic cm per minute) at 150° C. under the condition that the electrolyte membrane was not hydrated. Since an electrolyte doped with phosphoric acid is used, the fuel cell performance improves with time; therefore the final measurement is determined after aging when the operating voltage reaches a maximum. The area of the cathode and the anode is fixed to 2.8×2.8=7.84 cm$^2$. The thickness of the cathode and the anode can be varied depending on the amount of slurry coated on the carbon paper, but in this example, the thickness of the cathode was approximately 430 μm and the thickness of the anode was approximately 390 μm.

Example 2

Manufacturing an Electrode for Fuel Cells and a Fuel Cell Employing the Electrode An electrode for fuel cells and a fuel cell employing the electrode were manufactured in the same manner as in Example 1 except that 0.6 g of t-Buph-a represented by Formula 4 was used instead of 0.4 g of t-Buph-a. The platinum cobalt loading in the completed cathode was 2.5 mg/cm$^2$.

Example 3

Manufacturing an Electrode for Fuel Cells and a Fuel Cell Employing the Electrode An electrode for fuel cells and a fuel cell employing the electrode were manufactured in the same manner as in Example 1 except that 0.2 g of t-Buph-a represented by Formula 4 was used instead of 0.4 g of t-Buph-a. The platinum cobalt loading in the completed cathode was 2.0 mg/cm².

Comparative Example 1

Manufacturing an Electrode for Fuel Cells and a Fuel Cell Employing the Electrode An electrode for fuel cells and a fuel cell employing the electrode were manufactured in the same manner as in Example 1 except that t-Buph-a represented by Formula 4 was not added. The platinum cobalt loading in the completed cathode was 3.0 mg/cm² and the platinum loading amount of the completed anode was 1.4 mg/cm².

Comparative Example 2

Manufacturing an Electrode for Fuel Cells and a Fuel Cell Employing the Electrode An electrode for fuel cells and a fuel cell employing the electrode were manufactured in the same manner as in Example 1 except that 0.1 g of SB (2,6-di-tert-butyl-4-methylpyridine, CAS No. 38222-83-2) represented by Formula 18, below, was used instead of the t-Buph-a represented by Formula 4.

Formula 18

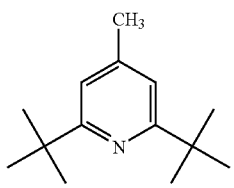

Comparative Example 3

Manufacturing an Electrode for Fuel Cells and a Fuel Cell Employing the Electrode An electrode for fuel cells and a fuel cell employing the electrode were manufactured in the same manner as in Example 1 except that 0.4 g of tris-(4-hydroxyphenyl)phosphate represented by the Formula below was used instead of the t-Buph-a represented by Formula 4:

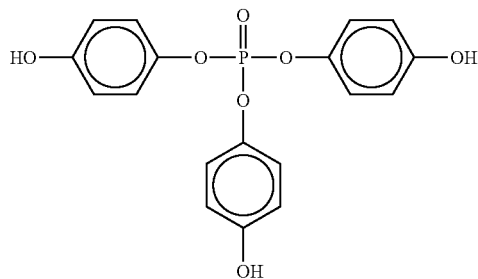

The changes in cell potential as a function of current density were measured in the fuel cells of Examples 1 to 3 and Comparative Example 1, and the results are shown in FIGS. 1 through 4, respectively.

Referring to FIGS. 1 through 4, it can be seen that MEA performance is improved when using the electrode manufactured by adding t-Buph-a of Formula 4 except when 0.2 g of t-Buph-a was added. That is, when n 0.4 g of t-Buph-a 0.4 was added, the improvement in performance was highest, resulting in a voltage of 0.716 V at 0.3 A/cm² for 264 hours of aging (Example 1, FIG. 1). The analogous numbers for 0.6 g t-Buph-a were 312 hours of aging, 0.707 V measured at 0.3 A/cm² (Example 2, FIG. 2). However, there was no change in performance at 144 hours of aging when 0.2 g of t-Buph-a was added (Example 3, FIG. 3) with respect to the performance at 360 hours of aging when no t-Buph-a was added (Comparative Example 1, FIG. 4); in both cases, the voltage measured at a current density of 0.3 A/cm² was 0.699 V. Therefore, it is shown that the additive, that is, t-Buph-a evenly disperses phosphoric acid to electrodes with micropores, and increases the three-phase interfacial area, thereby improving the performance of the MEA.

Measurement 1: Measurement of Cell Resistance

Figure 5:
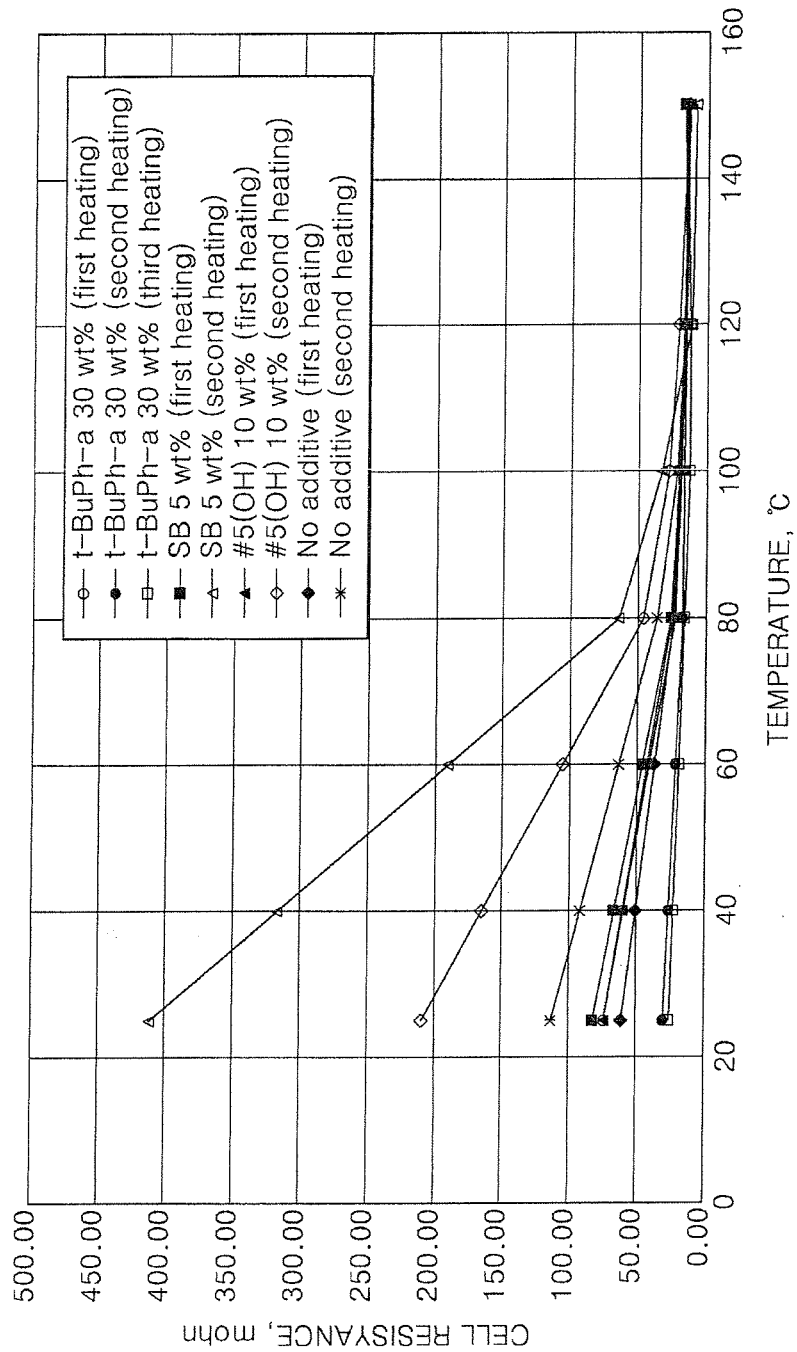
FIG. 5 shows the results of measuring at 1 kHz the cell resistance of a membrane electrode assembly (MEA) manufactured according to Example 2 and Comparative Examples 1-3, as a function of temperature, during repeated cooling-heating of the cells after the cell capacity reaches a maximum point.

After the cell performance of the MEA obtained from Example 2 and Comparative Examples 1-3 was maximized, cell resistance was measured as a function of temperature at 1 kHz during repeated cooling-heating of the cell, and the result is shown in FIG. 5. In FIG. 5, t-Buph-a 30 wt % is from Example 2, SB 5 wt % is from Comparative Example 2, and #5(OH) is from Comparative Example 3.

Referring to FIG. 5, MEAs were formed using electrodes manufactured in the same manner as in Example 1 except that different additives were used as described above and shown on FIG. 5, and the cell resistance at 1 kHz was measured with an AC ohmmeter at each temperature during repeated cooling-heating of the cell after the cell performance was maximized. It is observed that the cell resistance of the MEA employing the electrode to which t-Buph-a is added shows little increase in cell resistance during cooling (little hysteresis). A large increase in cell resistance when cooling is related to increases not only in the electrolyte membrane resistance but also in the interfacial resistance. Thus, it is shown that the t-Buph-a additive, unlike other additives, maintains the dispersed state of phosphoric acid within the electrodes, and thus keeps the interfacial resistance low.

Measurement 2: Measurement of Cell Resistance

Now turning to Table 1, to analyze the improvement in performance of the fuel cell according to one embodiment of the present invention, the voltage as a function of log(i) was calculated, where y=voltage, the y intercept is a, the slope is b, was obtained by carrying out Tafel fitting. The y intercept value, which is related to exchange current density, increases when additives are used. The slope, which is related to the reaction mechanism, shows a distinctively different value for a PBI standard electrode from a PTFE electrode, thus changes in reaction mechanism are presumed.

STD PBI of Table 1 is a fuel cell which was manufactured in the same manner as in Example 1 except that polybenzimidazole was added as a binder instead of polyvinylidenefluoride. STD PTFE(623) of Table 1 is a fuel cell which was manufactured in the same manner as in Example 1 except that polytetrafloroethylene was added as a binder instead of polyvinylidenefluoride. mBOA (0.17 parts by weight) is a fuel cell which was manufactured in the same manner as in Example 1 except that 0.17 parts by weight of t-Buph-a based on 1 part by weight of catalyst was added. mBOA No. 4 (0.22 parts by weight mBOA) is a fuel cell which was manufactured in the same manner as in Example 1 except that 0.22 parts by weight of t-Buph-a based on 1 part by weight of catalyst was added. mBOA (N.A.) is a fuel cell which was manufactured in the same manner as in Example 1 except that an electrolyte membrane, which was obtained by dissolving t-Buph-a in phosphoric acid and loading the mixture solution into the benzoxazine monomer/polybenzimidazole copolymer, was used instead of directly adding t-Buph-a to the electrodes.

The results of the Tafel fitting measurements are shown in Table 1 below.

TABLE 1

| COMPOSITION | ADDITIVE OR BINDER | E = a + b * ln(i) | | E = a + b' * log(i) |
|---|---|---|---|---|
| | | a | b | b' (mV/decade) |
| STB PBI | PBI | 0.576 | −0.038 | −86.5 |
| STD PTFE(623) | PTFE | 0.656 | −0.051 | −116.6 |
| mBOA (17 wt %) | mBOA | 0.699 | −0.046 | −104.9 |
| mBOA-4 (22 wt %) | mBOA | 0.673 | −.0.044 | −101.2 |
| mBOA (N.A.) | mBOA | 0.705 | −0.045 | −103.0 |

Referring to Table 1, when t-Buph-a is added, the y intercept (a value), which is related to the three-phase interfacial area, increases. Therefore, it can be seen that using t-Buph-a, evenly disperses phosphoric acid within the electrodes and thus increases the three-phase interfacial area. The slope b, which is related to the reaction mechanism, has a value between the values of the sole phosphoric acid type electrode and the electrode using PBI as a binder when the additive t-Buph-a, was added. It is known that when using PBI as a binder, the small molecule PBI dissolves in phosphoric acid and is adsorbed on the surface of Pt, thereby reducing the absolute value of the slope, and that a sole phosphoric acid type electrode has a slope value of around negative 120. Therefore, it could be seen that adding t-Buph-a results in a change in reaction mechanism.

While the present invention has been particularly shown and described with reference to exemplary embodiments thereof, it will be understood by those of ordinary skill in the art that various changes in form and details may be made therein without departing from the spirit and scope of the present invention as defined by the following claims.

The electrode for fuel cells according to embodiments of the present invention contains an even distribution of benzoxazine monomer which is a hydrophilic (or phosphoric acidophilic) material and dissolves in phosphoric acid but does not poison catalysts, thereby improving the wetting capability of phosphoric acid ($H_3PO_4$) within the electrodes and thus allowing phosphoric acid to permeate first into micropores in electrodes. As a result, flooding is efficiently prevented. That is, liquid phosphoric acid existing in a large amount within the electrodes inhibits gas diffusion; this flooding occurs when phosphoric acid permeates into macropores in the electrodes. This prevention of flooding increases the three-phase interfacial area of gas (fuel gas or oxidized gas)-liquid (phosphoric acid)-solid (catalyst).

Therefore, the fuel cell employing an electrode according to embodiments of the present invention can operate under conditions of high-temperature and a dry environment and demonstrate improved cell performance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode for fuel cells comprising a catalyst layer coated on a carbon support, the catalyst layer containing a benzoxazine monomer represented by Formula 1, a catalyst, and a binder:

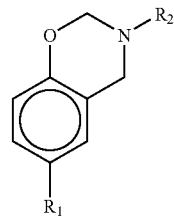

[Formula 1]

wherein $R_1$ is a hydrogen atom, a substituted or unsubstituted C1-C20 alkyl group, a substituted or unsubstituted C2-C20 alkenyl group, a substituted or unsubstituted C2-C20 alkynyl group, or a substituted or unsubstituted C6-C20 aryl group;

wherein $R_2$ is a substituted or unsubstituted C6-C20 aryl group, a substituted or unsubstituted C3-C20 heteroaryl group, a substituted or unsubstituted C2-C20 heterocyclic group, or a substituted or unsubstituted C2-C20 heterocyclic alkyl group; and wherein a substituent of the substituted alkyl group of $R_1$, the substituted alkenyl group of $R_1$, the substituted alkynyl group of $R_1$, the substituted aryl group of $R_1$, the substituted aryl group of $R_2$, the substituted heteroaryl group of $R_2$, the substituted heterocyclic group of $R_2$, or the substituted heterocyclic alkyl group of $R_2$ is: a) a halogen atom; b) an additional substituted C1-C20 alkyl group that is itself substituted with a halogen atom, a hydroxy group, a nitro group, a cyano group, an amino group, an amidino group, a hydrazine, a hydrazone, a carboxyl group or a salt thereof, a sulfonic group or a salt thereof, or a phosphate group or salt thereof; or c) an additional C1-C20 alkyl group, C2-C20 alkenyl group, C2-C20 alkynyl group, C2-C20 heteroalkyl group, C6-C20 aryl group, C7-C20 arylalkyl group, C6-C20 heteroaryl group, or C6-C20 heteroarylalkyl group.

2. An electrode for fuel cells comprising a catalyst layer coated on a carbon support, the catalyst layer containing a benzoxazine monomer represented by Formula 1, a catalyst, and a binder:

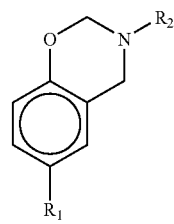

[Formula 1]

wherein $R_1$ is a C1-C10 alkyl group, an allyl group, a C6-C20 aryl group, a tertbutyl group, a C2-C10 alkenyl group, or a C2-C10 alkynyl group, and $R_2$ is a group represented by one of the following formulae:

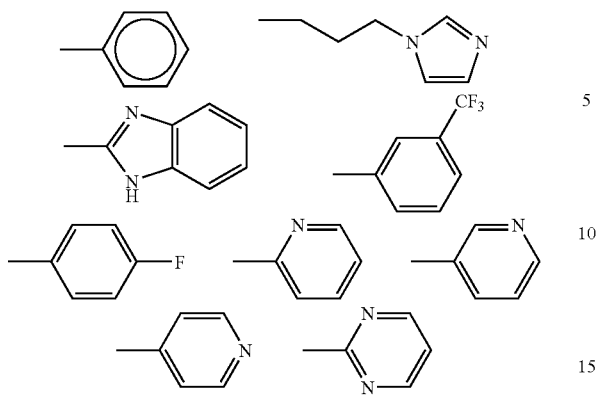

3. The electrode of claim 2, wherein the content of the benzoxazine monomer is 0.001 to 0.5 parts by weight based on one part by weight of the catalyst.

4. The electrode of claim 2, wherein the catalyst is platinum, a platinum alloy, or a mixture of platinum with at least one metal selected from the group consisting of gold, palladium, rhodium, iridium, ruthenium, tin, molybdenum, cobalt, and chromium.

5. The electrode of claim 2, wherein the binder is at least one polymer selected from the group consisting of poly(vinylidenefluoride), polytetrafluoroethylene, and tetrafluoroethylene-hexafluoroethylene copolymer.

6. The electrode of claim 2, wherein the binder is 0.001 to 0.5 parts by weight based on one part by weight of the catalyst.

7. A fuel cell comprising the electrode of claim 2.

8. A method of manufacturing the electrode for fuel cells of claim 2, comprising:
  obtaining a dispersed catalyst solution by dispersing the catalyst in a solvent;
  adding, mixing and stirring of a mixture containing the benzoxazine monomer represented by Formula 1, the binder, and the solvent with the dispersed catalyst solution; and
  coating the mixture on the surface of the carbon support.

9. The method of manufacturing the electrode for fuel cells of claim 8, wherein the coating method comprises using a doctor blade, Meyer bar coating, or screen printing.

10. The method of manufacturing the electrode for fuel cells of claim 8, wherein the mixture that is coated on the carbon support is dried at temperatures in the range of 20° to 150° C. for periods of 10 to 60 minutes.

11. The method of manufacturing the electrode for fuel cells of claim 10, wherein the drying is carried out at room temperature for 60 minutes.

12. The method of manufacturing the electrode for fuel cells of claim 10, wherein the drying is carried out at a temperature of 60° C. for at least 15 minutes.

13. The method of manufacturing the electrode for fuel cells of claim 10, wherein the drying is carried out at a temperature of 80° C. for at least 10 minutes.

14. The method of manufacturing the electrode for fuel cells of claim 10, wherein the drying is carried out at a temperature of 120° C. for at least 10 minutes.

15. An electrode for fuel cells comprising a catalyst layer coated on a carbon support, the catalyst layer containing a benzoxazine monomer represented by Formula 1, a catalyst, and a binder:

[Formula 1]

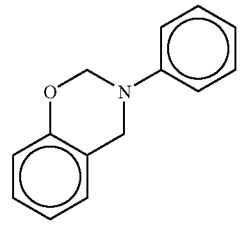

wherein the benzoxazine monomer represented by Formula 1 is represented by one of the compounds selected from the group consisting of Formulae 2 through 11:

[Formula 2]

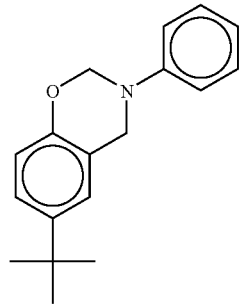

[Formula 3]

[Formula 4]

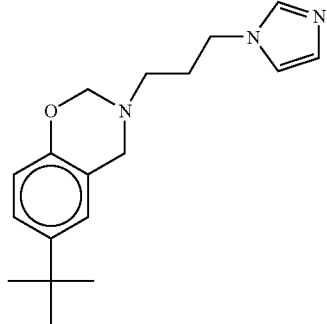

[Formula 5]

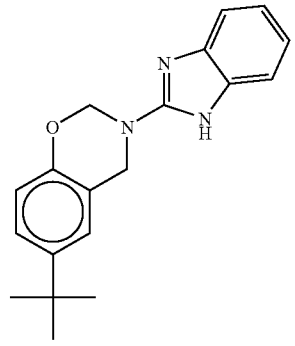

[Formula 6]

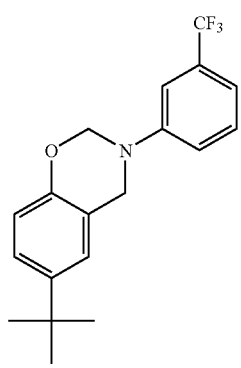

[Formula 7]

[Formula 8]

[Formula 9]

[Formula 10]

[Formula 11]

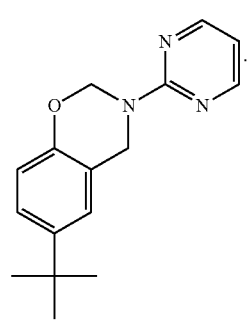

16. The electrode of claim 15, wherein the content of the benzoxazine monomer is 0.001 to 0.5 parts by weight based on one part by weight of the catalyst.

17. The electrode of claim 15, wherein the catalyst is platinum, a platinum alloy, or a mixture of platinum with at least one metal selected from the group consisting of gold, palladium, rhodium, iridium, ruthenium, tin, molybdenum, cobalt, and chromium.

18. The electrode of claim 15, wherein the binder is at least one polymer selected from the group consisting of poly(vinylidenefluoride), polytetrafluoroethylene, and tetrafluoroethylene-hexafluoroethylene copolymer.

19. The electrode of claim 15, wherein the binder is 0.001 to 0.5 parts by weight based on one part by weight of the catalyst.

20. A fuel cell comprising the electrode of claim 15.

21. A method of manufacturing the electrode for fuel cells of claim 15, comprising:

obtaining a dispersed catalyst solution by dispersing the catalyst in a solvent;

adding, mixing and stirring of a mixture containing the benzoxazine monomer represented by Formula 1, the binder, and the solvent with the dispersed catalyst solution; and coating the mixture on the surface of the carbon support.

22. The method of manufacturing the electrode for fuel cells of claim 21, wherein the coating method comprises using a doctor blade, Meyer bar coating, or screen printing.

23. The method of manufacturing the electrode for fuel cells of claim 21, wherein the mixture that is coated on the carbon support is dried at temperatures in the range of 20° to 150° C. for periods of 10 to 60 minutes.

24. The method of manufacturing the electrode for fuel cells of claim 23, wherein the drying is carried out at room temperature for 60 minutes.

25. The method of manufacturing the electrode for fuel cells of claim 23, wherein the drying is carried out at a temperature of 60° C. for at least 15 minutes.

26. The method of manufacturing the electrode for fuel cells of claim 23, wherein the drying is carried out at a temperature of 80° C. for at least 10 minutes.

27. The method of manufacturing the electrode for fuel cells of claim 23, wherein the drying is carried out at a temperature of 120° C. for at least 10 minutes.

* * * * *